No. 804,855. PATENTED NOV. 21, 1905.
C. L. IRESON.
LEATHER WEARING TREAD FOR RESILIENT TIRES.
APPLICATION FILED MAR. 17, 1905.
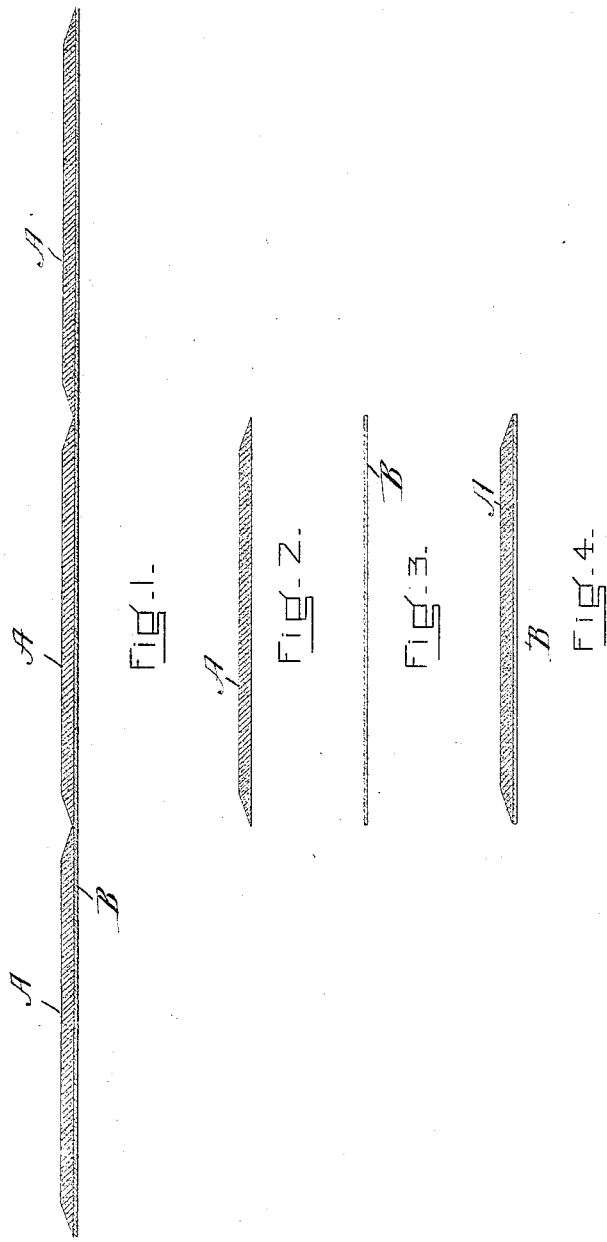

UNITED STATES PATENT OFFICE.

CHARLES L. IRESON, OF BOSTON, MASSACHUSETTS.

LEATHER WEARING-TREAD FOR RESILIENT TIRES.

No. 804,855.      Specification of Letters Patent.      Patented Nov. 21, 1905.

Application filed March 17, 1905. Serial No. 250,564.

*To all whom it may concern:*

Be it known that I, CHARLES L. IRESON, a citizen of the United States, and a resident of Boston, in the county of Suffolk and State of Massachusetts, have invented a new and useful Improvement in Leather Wearing-Treads for the Resilient Tires of Motor and other Vehicles, of which the following is a full, clear, and exact description, reference being had to the accompanying drawings, forming a part of this specification, in explaining its nature.

It is desirable that the resilient treads of motor and other vehicles, which are composed largely of vulcanized india-rubber, shall have wearing-sections of a different nature from rubber, which abrades readily, is puncturable, and also slippery under some conditions of use. Certain kinds of leather applied by vulcanization to the vulcanized rubber of the tire provide a better wearing-surface than the rubber, because it does not abrade so readily, because it is less puncturable, and because it holds better under the conditions which cause "skidding."

My invention consists in furnishing such leather wearing sections or treads in a form or shape for sale and for the ready attachment to tires, and this result is secured by preparing such leather wearing sections or treads with surfaces which adapt them to be attached to the vulcanized rubber of the treads by vulcanization. This attaching-section may be made continuous and may serve to hold in line or order any desired number of treads. I have represented both structures in the drawings.

The leather treads are prepared by having secured to their inner surfaces a layer of vulcanizable rubber compound which is adapted either by cold or hot vulcanization to unite the leather to the vulcanized rubber of the tire.

I will now describe the invention in conjunction with the drawings forming a part of this specification, wherein—

Figure 1 represents a number of leather sections or treads attached to a common holding and vulcanizable strip. Fig. 2 represents a single leather wearing section or tread; Fig. 3, its vulcanizable holding-strip; and Fig. 4, the tread and the strip united together as an article of manufacture, the vulcanizable strip still being in its vulcanizable condition.

Referring to the drawings, A represents a number of wearing sections or treads of leather.

B represents the vulcanizable strip of rubber compound to which they are secured, preferably by rubber-cement. This strip may be of any length—that is, it may carry treads for a large number of tires, if desired, and thus furnish a means of marketing them, or each tread may have its individual vulcanizable uniting strip or section, as represented in Fig. 4.

In order to secure the wearing sections or treads thus prepared to the vulcanized stock, it is simply necessary where cold vulcanization is used to employ an exciting agent which shall cause the vulcanizable rubber to vulcanize the vulcanized rubber and the leather together under pressure. If hot vulcanization is employed, the tread carrying a uniting-sheet made of the usual vulcanizable compound and the leather tread or wearing-section will be united under pressure to the rubber of the tire.

It may be desirable to prepare the vulcanized rubber of the tire for receiving and uniting with the uniting medium by roughening its surface and by even coating it with a coating of rubber-cement.

Having thus fully described my invention, I claim and desire to secure by Letters Patent of the United States—

1. As an improved article of manufacture, a tread or wearing-surface for a resilient, vulcanized tire having attached to its inner surface a vulcanizable rubber compound.

2. As an improved article of manufacture, a leather wearing surface or tread for a resilient tire, and a body or sheet of vulcanizable rubber compound associated therewith and adapted to permanently combine the tread or wearing-section with the vulcanized rubber of the tire.

3. A series of leather treads or wearing-sections for a resilient rubber tire connected together by a strip of vulcanizable rubber compound which is also usable for uniting the treads or wearing-surfaces to the vulcanized rubber.

CHARLES L. IRESON.

Witnesses:
F. F. RAYMOND, 2d,
M. V. FOLEY.